Jan. 25, 1938.　　　　J. DUFF, JR　　　　2,106,596
DELIVERY NOZZLE
Filed May 21, 1937
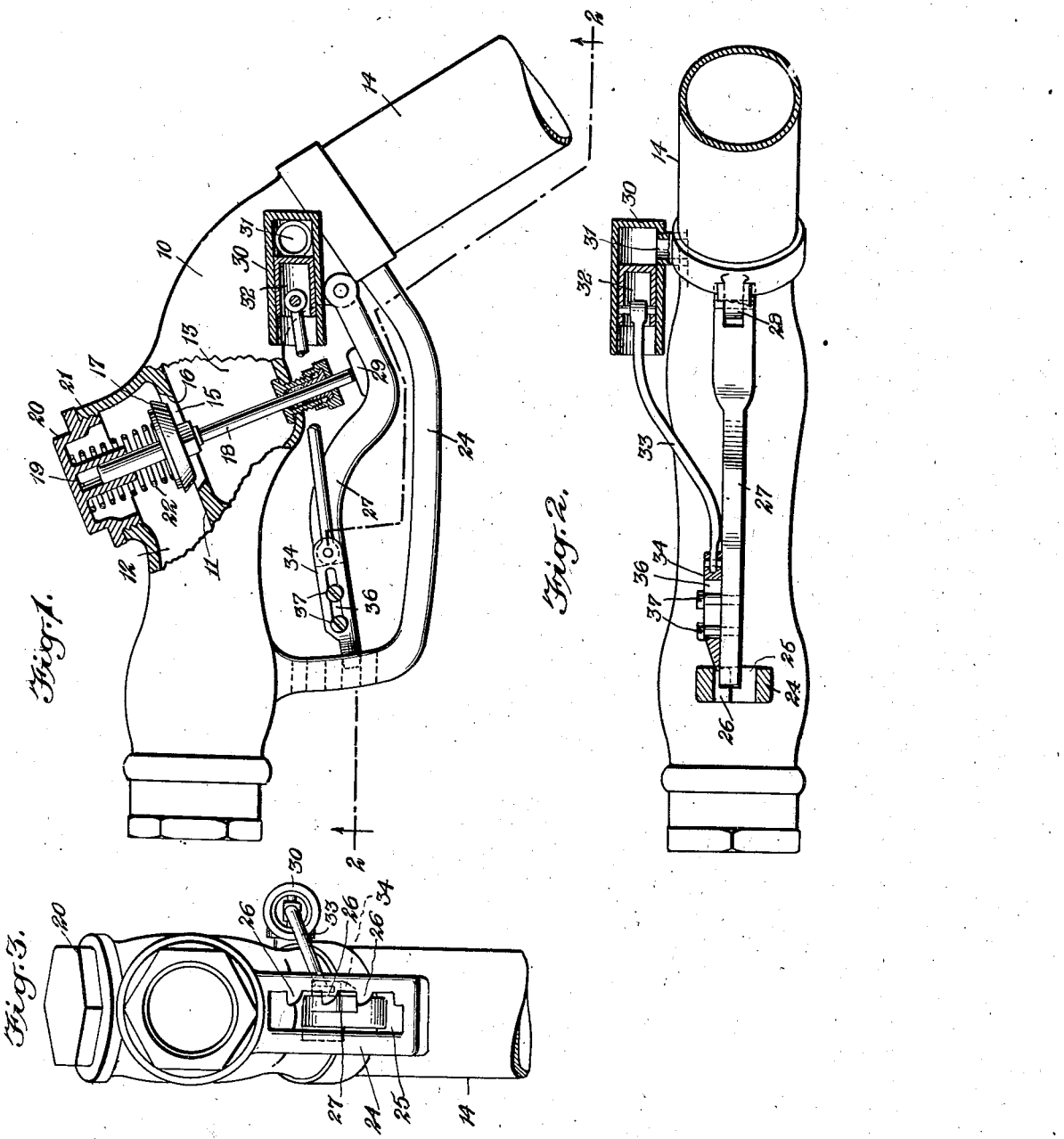
INVENTOR
John Duff Jr.

Patented Jan. 25, 1938

2,106,596

UNITED STATES PATENT OFFICE 2,106,596

DELIVERY NOZZLE

John Duff, Jr., New Bedford, Mass.

Application May 21, 1937, Serial No. 143,957

5 Claims. (Cl. 226—127)

This invention relates to delivery nozzles and more specifically to an automatic shut-off nozzle which is manually controlled to open the valve of the nozzle and automatically controlled to cause the valve to close or shut off when the tank is filled and the liquid backs up in the delivery line.

The invention embodies many novel features of construction and combinations and arrangements of parts, all of which will be more fully hereinafter described and pointed out in the claims.

In the accompanying drawing—

Fig. 1 is a view partly in side elevation and partly in section illustrating my improved delivery nozzle, showing the valve in open position:

Fig. 2 is an inverted sectional plan view taken mainly on the staggered line 2—2 of Fig. 1, with portions shown in section; and Fig. 3 is an end view of Fig. 1.

10 represents the casing of my improved delivery nozzle which is divided by a partition 11 into an inlet chamber 12 and an outlet chamber 13. This inlet chamber or inlet end of chamber 11 is adapted to be operatively connected with the reservoir or tank of a delivery truck and the outlet end of the chamber 13 is operatively connected by a pipe 14 with the inlet line of a household tank. The partition 11 above referred to is provided with an opening 15, the walls of which constitute a valve seat 16 normally engaged by a valve 17 to close the opening. This valve 17 is fixed to a stem 18 extending above and below the valve, the upper end of the stem moving in a guide sleeve 19 on a cap nut 20 screwed into a threaded opening 21 in the casing 10. A coil spring 22 is located around the stem 18 and guide sleeve 19 and interposed between the cap nut 20 and the valve 17 to normally hold the valve on its seat and in closed position. The lower end of the stem 18 extends through a stuffing box 23 and projects the desired distance below the casing 10.

24 represents a somewhat angular shaped bar having its ends integral or otherwise fixed to the casing 10 and located below the casing. One end of this bar 24 which is relatively straight and is at an approximate right angle to the casing 10 is formed with a longitudinal slot 25, the wall at one side of this slot 25 being provided with a series of inwardly projecting teeth 26.

27 represents a hand-operated lever pivotally connected at one end to a web 28 on the casing 10 and at its free end movable in the slot 25 and adapted not only to move longitudinally of the slot, but also to have a lateral movement of the slot so as to engage any of the series of teeth 26. This lever 27, near its pivotal end, is provided with a relatively flat abutment 29 against which the lower end of the valve stem 18 bears so that when the free end of the lever 27 is moved upwardly and positioned over any of the teeth 26, the valve 17 will be moved to open position as shown in Fig. 1 of the drawing.

A cylinder 30 is secured to the casing 10 and is in open communication with the outlet end of the casing through the medium of a short nipple 31 located at one side and adjacent the closed end of the cylinder. In this cylinder 30 a plunger 32 is mounted and is connected by a rod 33 with a wedge 34. The wedge 34 is located adjacent the free end of the lever 27 and against one side of said lever, and is formed with a longitudinal slot 36 through which headed pins or screws 37 are projected, and fixedly secured in the lever so as to permit a longitudinal movement of the wedge 34 of the lever. Attention is particularly called to the shape of the forward or free end of the wedge 34 where it will be noted, particularly by reference to Figs. 2 and 3 of the drawing, that this member 34 is tapered or beveled both longitudinally and transversely so that it constitutes a wedge both longitudinally and transversely.

The operation of the nozzle is as follows: Assuming that the respective ends of the nozzle are operatively connected to the delivery tank and the household tank, the operator manually elevates the free end of the lever 27, causing the free end of the lever to engage over one of the teeth 26. This movement of the lever 27 opens the valve 17 and holds the valve in open position allowing the household tank to be filled.

If, for any reason, the household tank is filled and the liquid backs up in the delivery line 14 and in the outlet end of the casing 10, this liquid will flow into the cylinder 30. The pressure thus built up will cause the plunger 32 to move longitudinally in the cylinder and through the medium of the connecting rod 33 will force the wedge 34 forwardly, causing the same to engage the wall of the slotted member 24 and between the same and the free end of the lever 27, forcing this free end of the lever 27 laterally so as to force it off the tooth 26, and when in this position the free end of the lever can move downwardly permitting the valve 17 to automatically close.

The reason why the wedge-shaped member 34 at its free end is wedge shaped both longitudinally and transversely is to permit and cause the wedge together with the hand lever 27 to ride freely off the tooth 26 when the wedge is moved forwardly.

It is to be understood of course that my improved delivery nozzle constitutes a part of a line connecting a delivery truck with a house tank and the line is connected fixedly to the inlet of the house tank so that when the liquid in the tank fills and would otherwise overflow it passes up the line 17 into the cylinder 30 and operates the plunger to cause the valve to close.

While I have illustrated and described what I believe to be a preferred embodiment of my invention, it is obvious that various slight changes may be made with regard to the form and arrangement of parts without departing from my invention, and hence I do not limit myself to the precise details set forth but consider myself at liberty to make such changes and alterations as fairly fall within the spirit and scope of the claims.

I claim:

1. Apparatus of the character described, including a casing, a spring-pressed valve in the casing normally closing the passage therethrough, a stem on the valve projecting outside of the casing, a manually movable pivoted lever adapted to engage the stem and open the valve when the lever is moved in one direction, a fixed member having a series of teeth thereon adapted to be engaged by the free end of the lever, a wedge having sliding engagement with the lever at its free end, a cylinder in open communication with the outlet end of the casing, a plunger in the cylinder, and a rod operatively connecting the plunger and the wedge so that when the plunger is caused to move by the pressure of the liquid in the cylinder the wedge will engage the fixed member to force the other end of the lever out of engagement with the teeth and allow said valve to close.

2. Apparatus of the character described, including a casing, a spring-pressed valve in the casing normally closing the passage therethrough, a stem on the valve projecting outside of the casing, a manually movable pivoted lever adapted to engage the stem and open the valve when the lever is moved in one direction, a fixed member having a series of teeth thereon adapted to be engaged by the free end of the lever, a wedge having sliding engagement with the lever at its free end, a cylinder in open communication with the outlet end of the casing, a plunger in the cylinder, and a rod operatively connecting the plunger and the wedge so that when the plunger is caused to move by the pressure of the liquid in the cylinder the wedge will engage the fixed member to force the other end of the lever out of engagement with the teeth and allow said valve to close, said fixed member constituting a slotted bar having a series of teeth projecting inwardly from one wall of the slot and said slot of a width to permit both longitudinal and lateral movement of the free end of the lever therein.

3. A delivery nozzle comprising a casing, a partition in the casing having an opening therein, a cap nut on the casing, a valve in the casing normally closing the opening, a stem on the valve projecting above and below the valve, said cap nut having a guide sleeve receiving the upper end of the stem, a spring between the cap nut and the valve normally holding the latter in closed position, a stuffing box in the lower portion of the casing through which the valve stem projects, a hand-operated lever pivotally connected to the casing and engaging the lower end of the stem, a toothed member engaged by the free end of the lever to hold the latter in position to open the valve, a wedge having sliding movement on the lever, and fluid-operated means for moving the wedge to disengage the lever from a tooth.

4. A delivery nozzle comprising a casing, a partition in the casing having an opening therein, a cap nut on the casing, a valve in the casing normally closing the opening, a stem on the valve projecting above and below the valve, said cap nut having a guide sleeve receiving the upper end of the stem, a spring between the cap nut and the valve normally holding the latter in closed position, a stuffing box in the lower portion of the casing through which the valve stem projects, a hand-operated lever pivotally connected to the casing and engaging the lower end of the stem, a toothed member engaged by the free end of the lever to hold the latter in position to open the valve, a wedge having sliding movement on the lever, and fluid-operated means for moving the wedge to disengage the lever from a tooth.

5. Apparatus of the character described, including a casing, a spring-pressed valve in the casing normally closing the passage therethrough, a stem on the valve projecting outside of the casing, a manually movable pivoted lever adapted to engage the stem and open the valve when the lever is moved in one direction, a fixed member having a series of teeth thereon adapted to be engaged by the free end of the lever, a wedge having sliding engagement with the lever at its free end, a cylinder in open communication with the outlet end of the casing, a plunger in the cylinder, and a rod operatively connecting the plunger and wedge so that when the plunger is caused to move by the pressure of the liquid in the cylinder the wedge will engage the fixed member to force the other end of the lever out of engagement with the teeth and allow said valve to close, said wedge at its free end beveled both longitudinally and transversely.

JOHN DUFF, Jr.